(12) United States Patent
Cheng et al.

(10) Patent No.: US 10,696,261 B2
(45) Date of Patent: Jun. 30, 2020

(54) SEAT ASSEMBLY INCLUDING AIRBAGS INTEGRATED INTO A TULIP ARMCHAIR

(71) Applicant: GM Global Technology Operations LLC, Detroit, MI (US)

(72) Inventors: Yi-Pen Cheng, Troy, MI (US); Chin-Hsu Lin, Troy, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/207,573

(22) Filed: Dec. 3, 2018

(65) Prior Publication Data

US 2020/0172040 A1  Jun. 4, 2020

(51) Int. Cl.
| | |
|---|---|
| *B60N 2/30* | (2006.01) |
| *B60R 21/207* | (2006.01) |
| *B60R 21/233* | (2006.01) |
| *B60R 21/231* | (2011.01) |
| *B60N 2/68* | (2006.01) |

(52) U.S. Cl.
CPC .......... *B60R 21/207* (2013.01); *B60N 2/3052* (2013.01); *B60R 21/233* (2013.01); *B60R 21/23138* (2013.01); *B60N 2/68* (2013.01); *B60R 2021/23146* (2013.01); *B60R 2021/23308* (2013.01)

(58) Field of Classification Search
CPC ................ B60N 2/3052; B60R 21/207; B60R 2021/23316
See application file for complete search history.

(56) References Cited

U.S. PATENT DOCUMENTS

| | | | | |
|---|---|---|---|---|
| 5,746,443 | A * | 5/1998 | Townsend | B60R 21/20 280/730.2 |
| 10,081,326 | B2 * | 9/2018 | Koike | B60N 2/79 |
| 10,479,310 | B2 * | 11/2019 | Dry | B60N 2/79 |
| 2011/0109070 | A1 * | 5/2011 | Tanaka | B60R 21/206 280/741 |

(Continued)

FOREIGN PATENT DOCUMENTS

| | | | | |
|---|---|---|---|---|
| DE | 102017213855 A1 * | 2/2019 | | B60R 21/233 |
| EP | 1792771 A1 * | 6/2007 | | B60N 2/42718 |

(Continued)

OTHER PUBLICATIONS https://hovding.com, accessed Oct. 1, 2018.

*Primary Examiner* — Timothy J Brindley
(74) *Attorney, Agent, or Firm* — Quinn IP Law

(57) ABSTRACT

A seat assembly includes a seat frame and a seat cushion coupled to the seat frame. The seat frame includes a seatback frame, a base frame coupled to the seatback frame, a first armrest frame coupled to the seatback frame, and a second armrest frame coupled to the seatback frame. The seat cushion covers the seat frame and is spaced apart from the seat frame to define a cavity therebetween. The seat assembly further includes an airbag coupled between the seat frame and the seat cushion. The airbag has a stowed position and a deployed position. In the stowed position, the airbag is disposed in the cavity between the seat frame and the seat cushion. In the deployed position, the airbag is partly disposed outside the cavity between the seat frame and the seat cushion to absorb energy.

16 Claims, 7 Drawing Sheets

(56) References Cited

U.S. PATENT DOCUMENTS

| | | | | |
|---|---|---|---|---|
| 2012/0161425 | A1* | 6/2012 | Kino | B60R 21/207 |
| | | | | 280/730.1 |
| 2014/0001799 | A1* | 1/2014 | Kalisz | B60N 2/914 |
| | | | | 297/216.1 |
| 2015/0097359 | A1* | 4/2015 | Rickenbach | B60R 21/23138 |
| | | | | 280/729 |
| 2015/0137572 | A1* | 5/2015 | Auger | B60N 2/062 |
| | | | | 297/344.21 |
| 2016/0052477 | A1* | 2/2016 | Tobata | B60R 21/207 |
| | | | | 280/730.1 |
| 2017/0028960 | A1* | 2/2017 | Kobayashi | B60N 2/42 |
| 2017/0057385 | A1* | 3/2017 | Kanto | B60N 2/42763 |
| 2017/0225640 | A1* | 8/2017 | Ohno | B60R 21/207 |
| 2017/0334385 | A1 | 11/2017 | Sakakibara et al. | |
| 2017/0341615 | A1* | 11/2017 | Kobayashi | B60R 21/207 |
| 2019/0023214 | A1* | 1/2019 | Kitagawa | B60R 21/237 |
| 2019/0023216 | A1* | 1/2019 | Sayed | B60R 21/23138 |
| 2019/0039552 | A1* | 2/2019 | Schafer | B60R 21/207 |
| 2019/0061581 | A1* | 2/2019 | White | B60R 21/207 |
| 2019/0092264 | A1* | 3/2019 | Spahn | B60R 21/207 |
| 2019/0111877 | A1* | 4/2019 | Line | B60N 2/42763 |
| 2019/0176740 | A1* | 6/2019 | Hioda | B60R 21/231 |

FOREIGN PATENT DOCUMENTS

| | | | | |
|---|---|---|---|---|
| WO | WO-2007049536 | A1 * | 5/2007 | ........... B60R 21/207 |
| WO | WO-2007049539 | A1 * | 5/2007 | ........... B60R 21/207 |
| WO | WO-2007055106 | A1 * | 5/2007 | ........... B60R 21/231 |
| WO | WO-2013157082 | A1 * | 10/2013 | ........ B60R 21/2346 |
| WO | WO-2014033820 | A1 * | 3/2014 | ........ B60R 21/2338 |
| WO | WO-2015075984 | A1 * | 5/2015 | ........... B60R 21/207 |

* cited by examiner

SEAT ASSEMBLY INCLUDING AIRBAGS INTEGRATED INTO A TULIP ARMCHAIR

INTRODUCTION

The present disclosure generally relates to seat assemblies and, more particularly, to a seat assembly including airbags integrated into a tulip armchair.

Some vehicles have airbags designed separately for frontal, side, and rear protection. In other words, the vehicle may include several airbags that protect vehicle occupant depending on the direction of the external force applied to the vehicle.

SUMMARY

The present disclosure describes an integrated arm seat, seatback, and seat cushion airbag system that is configured to protect an occupant from omni-directional external forces. The flattened or folded airbags will be placed in between the seat frame and the seat foam. When deployed when the vehicle is subjected to an external force, it may provide additional cushion space to protect the occupant's torso from rear and side external forces and prevent the occupant from submarining when the vehicle is subjected to frontal external forces. With a reclined occupant in frontal external force, the seat cushion may provide more additional crush space to protect the occupant. The presently disclosed airbag system provides additional cushions for frontal, side, rear, and oblique external forces to the occupant. When the vehicle is subjected to a frontal external force, the airbag system prevents occupant submarining by providing more support at the front end of the seat cushion and raises the seat cushion angle. When the vehicle is subjected to a frontal force and the seat is reclined, the airbag system deploys the seat cushion airbags for more protection. When the vehicle is subjected to an external side force, the airbag system provides protective cushioning by deploying the arm seat airbag in between the seat back and the arm rest. When the vehicle is subjected to a rear external force, the airbag system adds more protective cushioning space at the seatback to protect the occupant's torso.

The present disclosure describes a seat assembly of a vehicle. The seat assembly includes a tulip armchair. The tulip armchair is a contiguous, single molded seat and includes a seat frame. The seat frame includes a seatback frame, a base frame coupled to the seatback frame, a first armrest frame coupled to the seatback frame, and a second armrest frame coupled to the seatback frame. The seat assembly further includes a seat cushion coupled to the seat frame. The seat cushion covers the seat frame and is spaced apart from the seat frame to define a cavity therebetween. The seat assembly further includes an airbag coupled between the seat frame and the seat cushion. The airbag has a stowed position and a deployed position. In the stowed position, the airbag is disposed in the cavity between the seat frame and the seat cushion. In the deployed position, the airbag is partly disposed outside the cavity between the seat frame and the seat cushion to absorb energy when an external force is applied to the vehicle.

The seat cushion may be referred to as a first seat cushion. The first seat cushion may cover the seatback frame, the first armrest frame, and the second armrest frame. The first seat cushion may include a seatback cushion covering the seatback frame, a first armrest cushion covering the first armrest frame, and a second armrest cushion covering the second armrest frame. The airbag may be referred to as a first airbag. The first airbag may be disposed between the seatback frame and the seatback cushion, between the first armrest frame and the first armrest cushion, and between the second armrest frame and the second armrest cushion. The seat assembly may further include a second seat cushion covering the base frame. The seat assembly may further include a second airbag disposed between the base frame and the second seat cushion.

The first airbag may include a plurality of chambers independently inflatable from each other. The first airbag may include a first lateral chamber disposed between the first armrest frame and the first armrest cushion. The first lateral chamber is inflatable independently of a rest of the first airbag. The first airbag may include a second lateral chamber that is inflatable independently of the first lateral chamber. The second lateral chamber is disposed between the second armrest frame and the second armrest cushion. The first airbag may include a seatback chamber that is inflatable independently of the first lateral chamber and the second lateral chamber. The seatback chamber is disposed between the seatback frame and the seatback cushion. The seat assembly may further include a second seat cushion covering the base frame. The seat assembly further includes a second airbag disposed between the base frame and the second seat cushion. The second airbag includes a frontal chamber and a rear chamber independently inflatable from each other.

The present disclosure also describes an airbag system including the seat assembly described above. The airbag system includes a tulip armchair as described above. The airbag system also includes an airbag as described above. Further, the airbag system includes a sensor configured to detect an external force applied to the vehicle, a controller in communication with the sensor and the airbag. The controller is programmed to: determine that the external force has been applied to the vehicle based on a signal received from the sensor; and command the airbag to deploy and inflate in response to determining that the external force has been applied to the vehicle. As discussed above, the seat cushion may be referred to as a first seat cushion. The first seat cushion covers the seatback frame, the first armrest frame, and the second armrest frame. The first seat cushion includes a seatback cushion covering the seatback frame, a first armrest cushion covering the first armrest frame, and a second armrest cushion covering the second armrest frame. The airbag system may include a second airbag as described above. The first airbag may include a first lateral chamber, a second lateral chamber, and a seatback chamber as described above. The second airbag may include a frontal chamber and a rear chamber as described above. The sensor may be referred to as the first sensor. The first sensor may be further configured to detect a direction of the external force applied to the vehicle. The airbag system may further include a second sensor configured to detect a position of the tulip armchair. The tulip armchair is movable between a neutral position and a reclined position. The tulip armchair may also rotate and swivel relative to the vehicle floor. The controller may be programmed to: determine that the external force has been applied to the vehicle based on the signal received from the first sensor; determine that the external force applied to the vehicle is a rear external force based on the signal received from the first sensor, wherein the rear external force is applied to a rear of the vehicle; and command solely the seatback chamber to deploy and inflate in response to determining that the external force has been applied to the vehicle and that the external force applied to the vehicle is the rear external force.

The signal may be referred to as the first signal. The controller is programmed to: determine that the external force has been applied to the vehicle based on the first signal received from the first sensor; determine that the external force applied to the vehicle is a frontal external force based on the signal received from the first sensor, wherein the frontal external force is applied to a front of the vehicle; determine that the tulip armchair is in the neutral position based on a second signal received from the second sensor; and command solely the frontal chamber to deploy and inflate in response to determining that the external force has been applied to the vehicle and that the external force applied to the vehicle is the frontal external force, and that the tulip armchair is in the neutral position.

The controller may be programmed to: determine that the external force has been applied to the vehicle based on a first signal received from the first sensor; determine that the external force applied to the vehicle is a frontal external force based on the first signal received from the first sensor, wherein the frontal external force is applied to a front of the vehicle; determine that the tulip armchair is in the reclined position based on a second signal received from the second sensor; and command the frontal chamber to deploy and inflate in response to determining that the external force has been applied to the vehicle, that the external force applied to the vehicle is the frontal external force, and that the tulip armchair is in the reclined position.

The controller may be programmed to: determine that the external force has been applied to the vehicle based on the signal received from the first sensor; determine that the external force applied to the vehicle is a right-lateral external force based on the signal received from the first sensor, wherein the right-lateral external force is applied to a right side of the vehicle; and command solely the first lateral chamber to deploy and inflate in response to determining that the external force has been applied to the vehicle and that the external force applied to the vehicle is the right-lateral external force.

The controller may be programmed to: determine that the external force has been applied to the vehicle based on the signal received from the first sensor; determine that the external force applied to the vehicle is a left-lateral external force based on the signal received from the first sensor, wherein the left-lateral external force is applied to a left side of the vehicle; and command solely the second lateral chamber to deploy and inflate in response to determining that the external force has been applied to the vehicle and that the external force applied to the vehicle is the left-lateral external force.

The controller may be programmed to: determine that the external force has been applied to the vehicle based on the signal received from the first sensor; determine that the external force applied to the vehicle is a frontal external force based on the first signal received from the first sensor, wherein the frontal external force is applied to a front of the vehicle; determine that the tulip armchair is in the reclined position based on a second signal received from the second sensor; and command the frontal chamber and the rear chamber to deploy and inflate in response to determining that the external force has been applied to the vehicle, that the external force applied to the vehicle is the frontal external force, and that the tulip armchair is in the reclined position. The controller may also take into account the size of the vehicle occupant and the aggressiveness of the airbag deployment. In a tulip armchair, the vehicle occupant is surrounded by the armchair. Thus, if the vehicle occupant is a large person who takes up the whole seat, the controller does not inflate the lateral chambers. On the other hand, if the vehicle occupant is skinny with a lot of space between him and the seat, then the controller may command the inflation of the lateral chambers more aggressively.

The present disclosure also describes a vehicle including a vehicle body and a vehicle floor coupled to the vehicle body. The vehicle body and the vehicle floor collectively define a passenger compartment. The vehicle further includes a seat assembly as described above.

The above features and advantages and other features and advantages of the present disclosure are readily apparent from the following detailed description of the best modes for carrying out the disclosure when taken in connection with the accompanying drawings.

DETAILED DESCRIPTION

Figure 1:
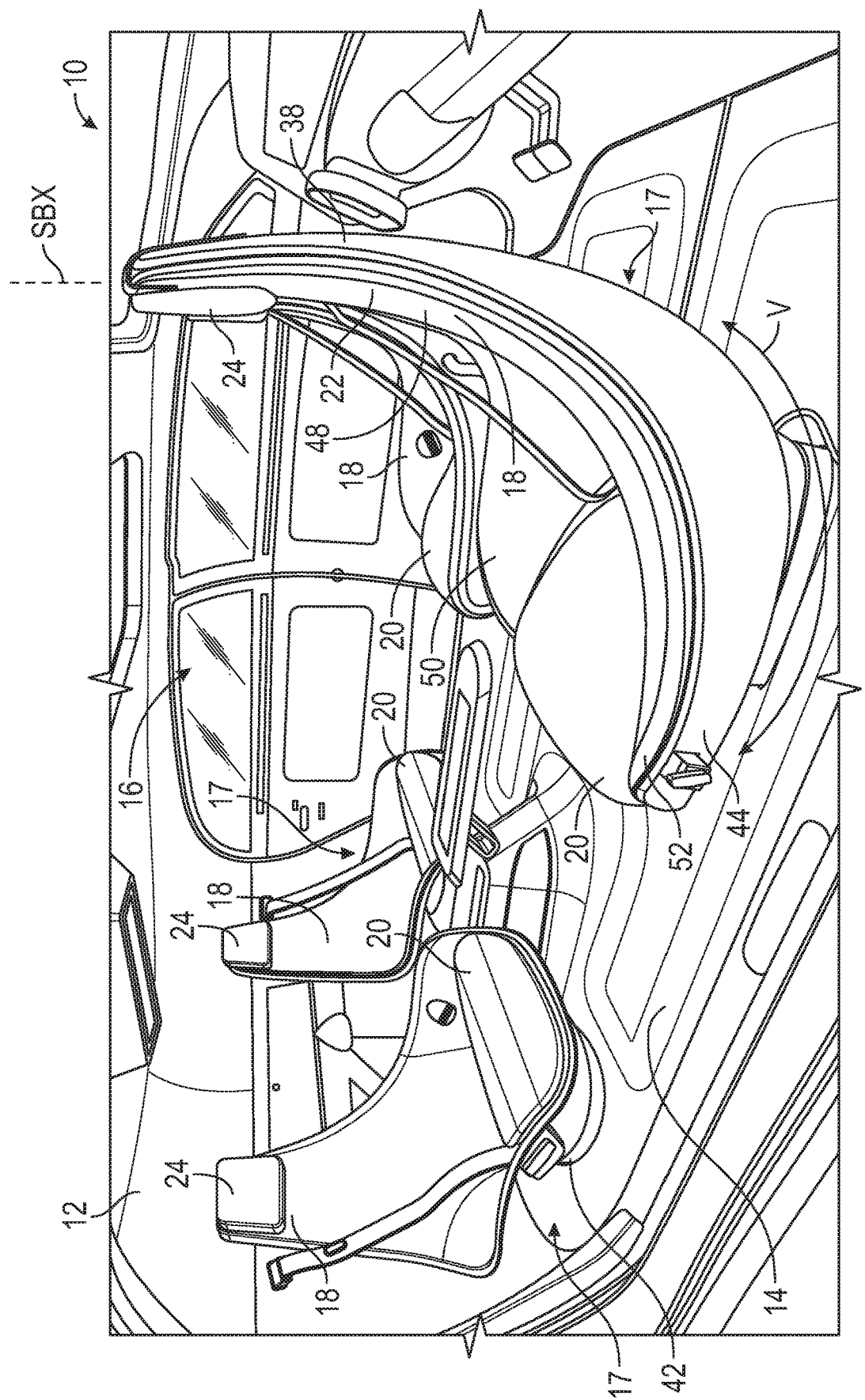
FIG. 1 is a schematic perspective view of an interior portion of a vehicle.
Figure 2:
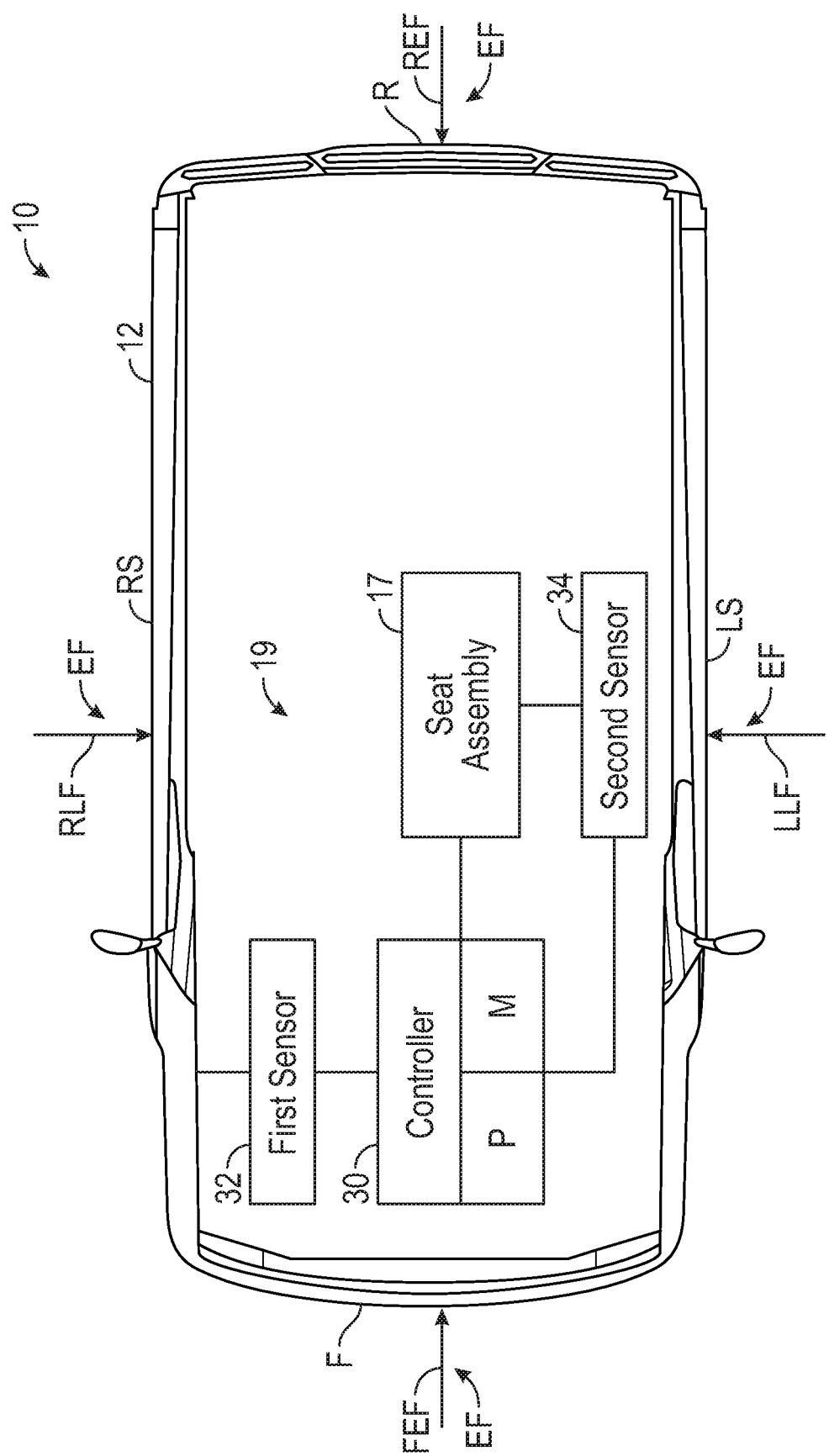
FIG. 2 is a schematic diagram of the vehicle of FIG. 1, depicting, among other things, a seat assembly, a controller, a first sensor, and a second sensor.

With reference to FIGS. 1 and 2, a vehicle 10 includes a vehicle body 12 and a vehicle floor 14 coupled to the vehicle body 12. The vehicle body 12 and the vehicle floor 14 collectively define a passenger compartment 16. The vehicle 10 further includes one or more tulip armchairs 18 disposed inside the passenger compartment 16. The term "tulip armchair" means a chair that resembles a tulip flower and includes two armrests. In the depicted embodiment, the vehicle 10 is an autonomous vehicle and the tulip armchairs 18 are therefore arranged in a "campfire" setting facing each other. One or more of the tulip armchairs 18 are rotatably coupled to vehicle floor 14. Consequently, the tulip armchairs 18 are configured to swivel relative to the vehicle floor 14 as indicated by double arrow V. Each tulip armchair 18 includes a seat base 20 configured to bear the weight of a vehicle occupant O, a seatback 22 coupled to the seat base 20, and a headrest 24 directly coupled to the seatback 22.

The seatback 22 is configured to support the back of the vehicle occupant O. The headrest 24 is configured to support the head of the vehicle occupant O.

With specific reference to FIG. 2, the tulip armchair 18 is part of a vehicle seat assembly 17. The seat assembly 17 is part of an airbag system 19. The airbag system 19 is part of the vehicle 10 and includes one or more controllers 30 for, among other things, controlling the operation of the airbag system 19. The controller 30 is therefore in communication with the airbag system 19 and is programmed to send commands to the airbag system 19. The term "controller" means a physical device including hardware elements such as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random-access memory (RAM), electrically-erasable programmable read-only memory (EEPROM), and the like. The methods described in the present disclosure may be recorded in memory (M) and executed by the processor (P) in the overall control of the airbag system 19.

The vehicle 10 further includes a first sensor 32 coupled to the vehicle body 12. The first sensor 32 is configured to detect the external force EF exerted on the vehicle body 12. The first sensor 32 may include an accelerometer to indirectly measure the magnitude of the external force EF by measuring the magnitude of the deceleration of the vehicle 10 when it is subjected to the external force EF. The first sensor 32 may include a gyro to determine the direction of the external force EF. In other words, the first sensor 32 may detect whether the external force EF is a frontal external force FEF, a rear external force REF, a right-side lateral force RLF, or left-side lateral force LLF. The frontal external force FEF is an external force EF applied to the front F of the vehicle body 12 of the vehicle 10. The rear external force REF is an external force EF applied to the rear R of the vehicle body 12 of the vehicle 10. The frontal external force FEF and the rear external force REF have opposite directions. The left-side lateral force LLF is an external force EF applied to the left side LS of the vehicle body 12 of the vehicle 10. The right-side lateral force RLF is an external force EF applied to the right side RS of the vehicle body 12 of the vehicle 10. The left-side lateral force LLF and the right-side lateral force RLF have opposite directions.

Figure 9:
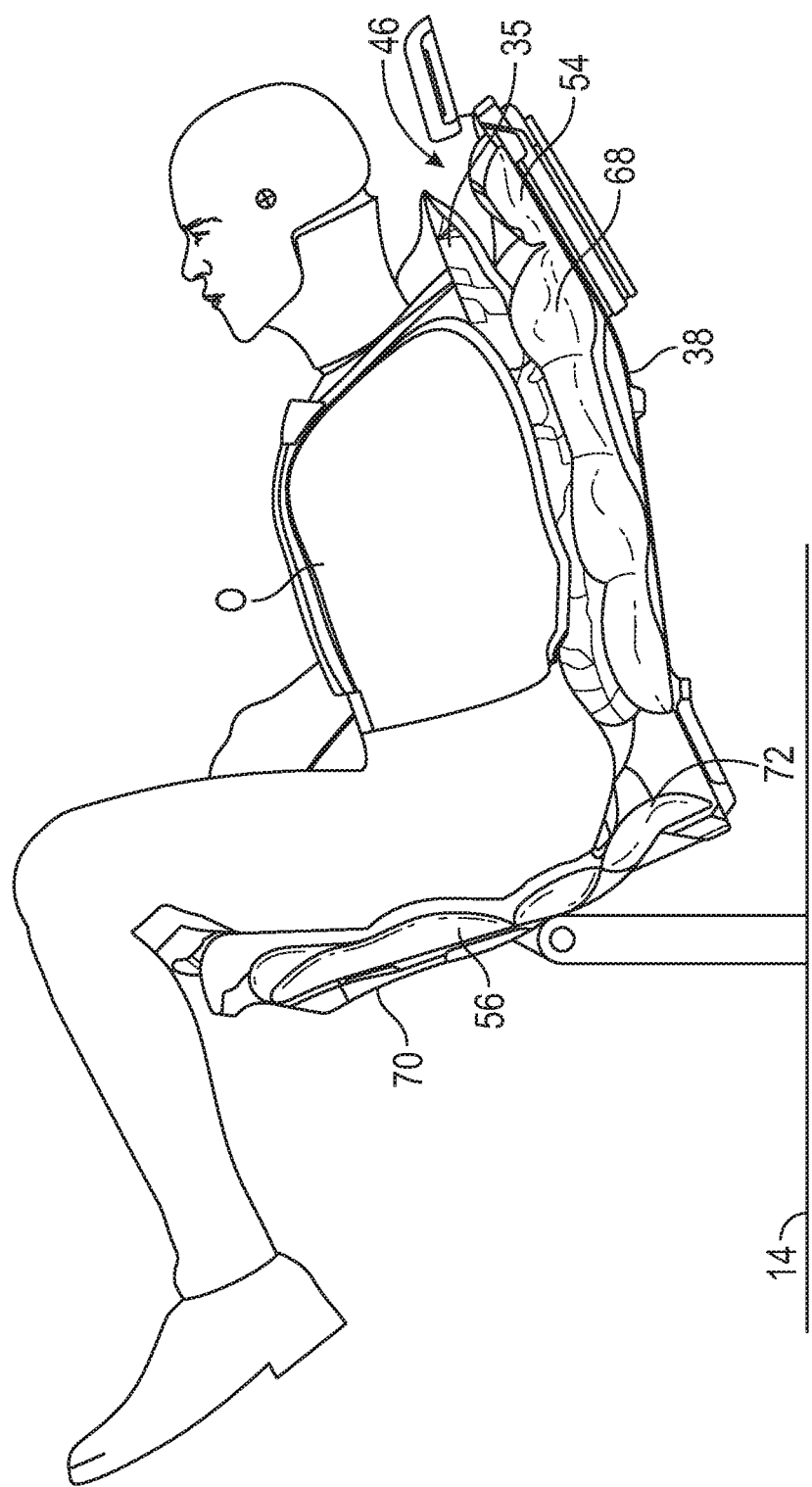
FIG. 9 is a schematic perspective, exploded view of the tulip armchair in a reclined position.

The vehicle 10 further includes a second sensor 34 coupled to the tulip armchair 18 and the controller 30. The controller 30 is in communication with the second sensor 34. The second sensor 34 is configured to detect a position of the tulip armchair 18 relative to the vehicle floor 14. The second sensor 34 may be referred to as a seat position sensor and may be a Hall-effect sensor. For instance, the second sensor 34 is configured to detect whether the tulip armchair 18 is in a neutral position (FIG. 3) or a reclined position (FIG. 9). The seatback 22 is elongated along a seatback axis SBX. In the neutral position, the seatback axis SBX, the angle from the vehicle floor 14 to the seatback axis SBX is between eighty-five degrees and ninety-five degrees. In the reclined position, the angle from the vehicle floor 14 to the seatback axis SBX is between ninety-six degrees and one hundred eighty-five degrees.

Figure 3:
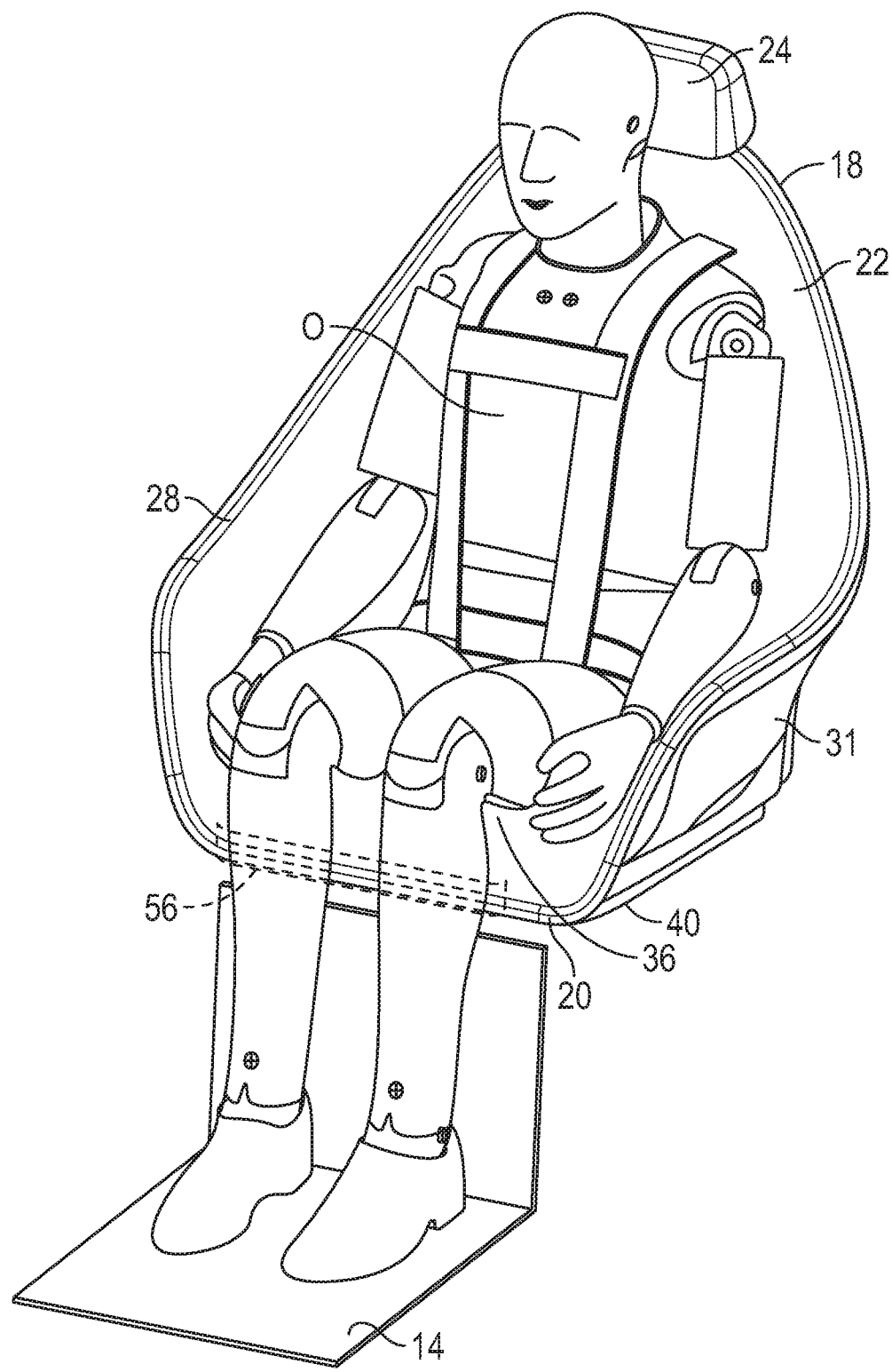
FIG. 3 is a schematic perspective view of the tulip armchair of the seat assembly of FIG. 2.
Figure 4:
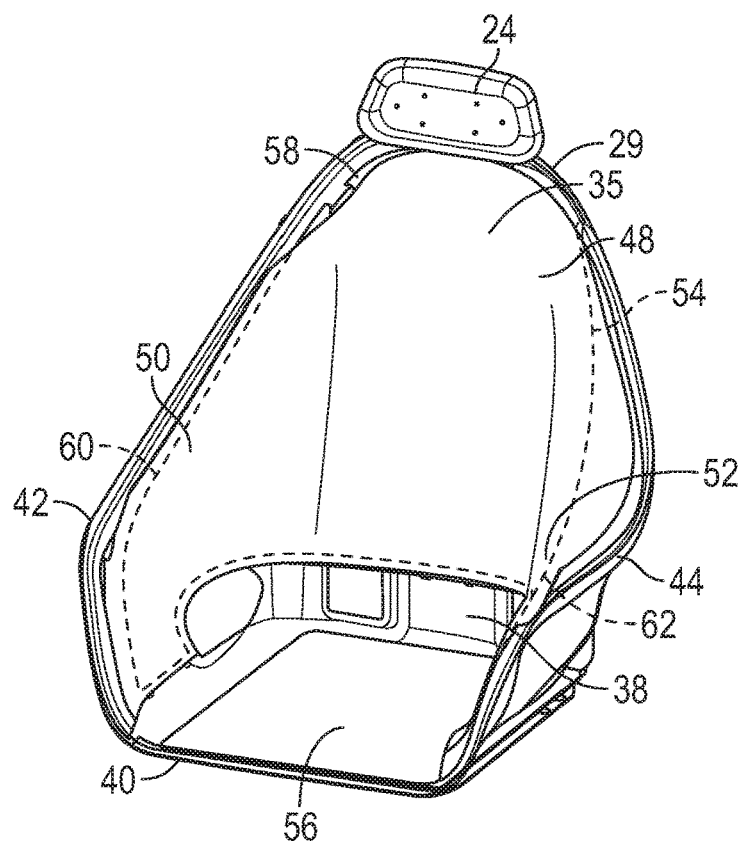
FIG. 4 is a schematic perspective view of the tulip armchair of the seat assembly of FIG. 2 without a second seat cushion and depicting a first airbag and a second airbag in a stowed position.
Figure 5:
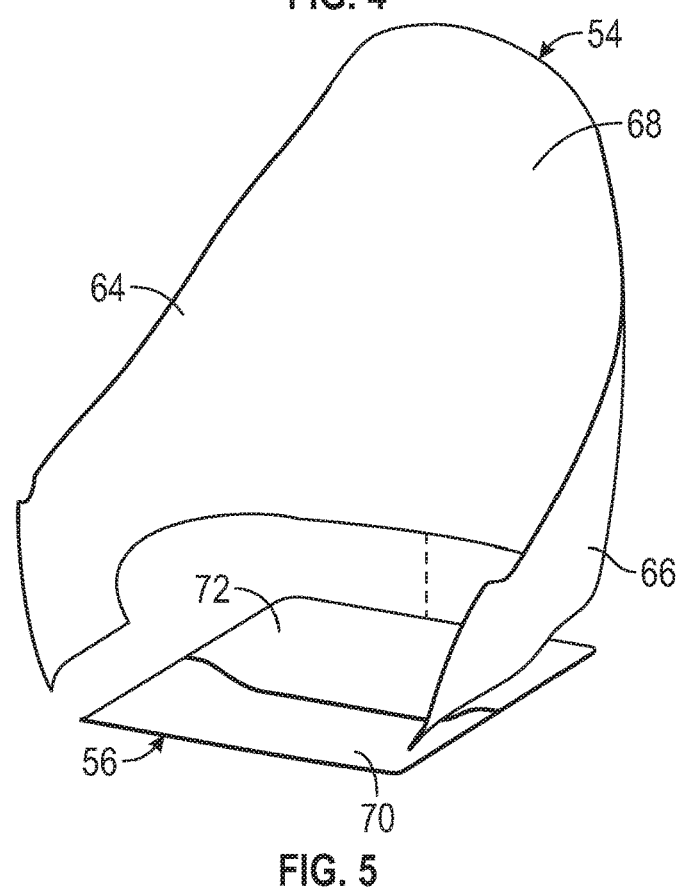
FIG. 5 is a schematic perspective, exploded view of the first airbag and the second airbag of the tulip armchair of FIG. 3, wherein the first and second airbags are in the deflated configuration.
Figure 6:
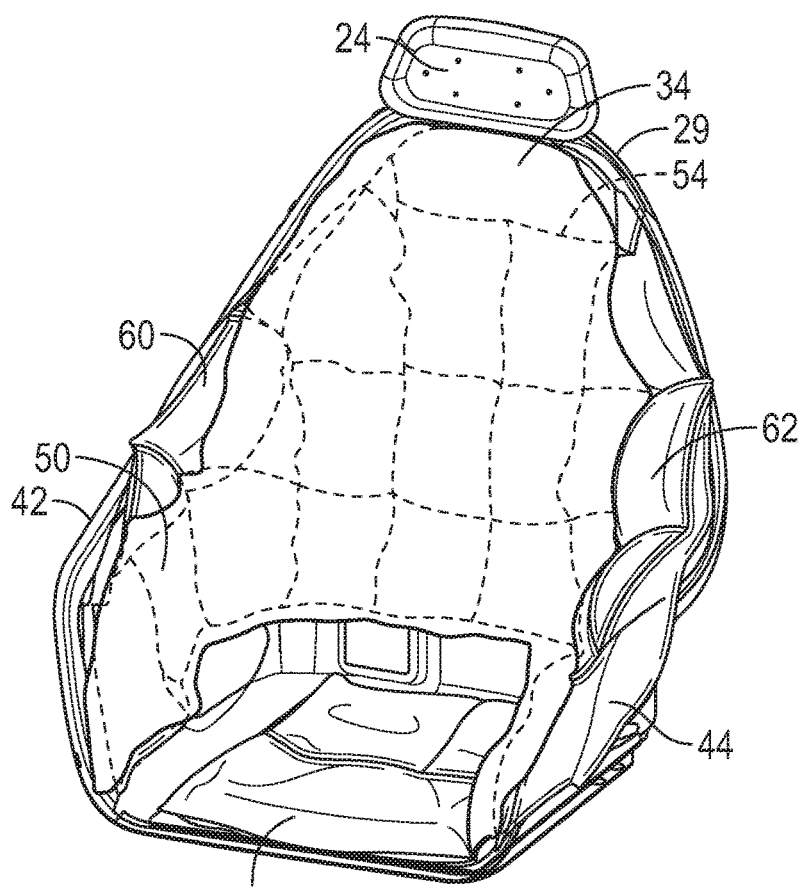
FIG. 6 is a schematic perspective view of the tulip armchair of the seat assembly of FIG. 2 without a second seat cushion and depicting a first airbag and a second airbag in a deployed position.

Referring to FIGS. 3-5, in addition to the seatback 22 and the seat base 20, the tulip armchair 18 includes a first armrest (or right-side armrest) 28 and a second armrest 31 laterally spaced apart from the first armrest 28. The tulip 18 includes a seat frame 29, a first seat cushion 35, and a second seat cushion 36 (FIG. 3). The seat frame 29 includes a seatback frame 38, a base frame 40 directly coupled to the seatback frame 38, a first armrest frame 42 directly coupled to the seatback frame 38, and a second armrest frame 44 coupled to the seatback frame 38. The seatback frame 38 is configured to bear the weight of the vehicle occupant O and may therefore be wholly or partly made of a metallic material. In the depicted embodiment, the seat frame 29 is configured as a one-piece unitary structure to enhance its structural integrity.

The first seat cushion 35 covers most (i.e., a majority of) the seat frame 29 to maximize comfort and is spaced apart from the seat frame 29 to define a cavity 46 (FIG. 9) therebetween. The first seat cushion 35 includes a seatback cushion 48 covering the seatback frame 38, a first armrest cushion 50 covering the first armrest frame 42, and a second armrest cushion 52 covering the second armrest frame 44. The second seat cushion 36 (FIG. 3) covers the base frame 40. The base frame 40 and the second seat cushion 36 collectively form the seat base 20. The seatback cushion 48 and the seatback frame 38 collectively form the seatback 22. The first armrest cushion 50 and the first armrest frame 42 collectively form the first armrest 28. The second armrest cushion 52 and the second armrest frame 44 collectively form the second armrest 31.

The seat assembly 17 further includes a first airbag 54 disposed in the cavity 46 and is coupled between the first seat cushion 35 and the seat frame 29. Specifically, the first airbag 54 is disposed between the seatback frame 38 and the seatback cushion 48, between the first armrest frame 42 and the first armrest cushion 50, and between the second armrest frame 44 and the second armrest cushion 52. The first airbag 54 has a stowed position (i.e., deflated configuration) and a deployed position (i.e., inflated configuration). In the stowed position, the first airbag 54 is disposed in the cavity 46 between the seat frame 29 and the first seat cushion 35. In the deployed position, the first airbag 54 is partly disposed outside the cavity 46 between the seat frame 29 and the first seat cushion 35 to manage/absorb energy when the external force EF is applied to the vehicle body 12 of the vehicle 10. Although the cavity 46 is clearly shown in FIG. 9, the embodiments shown in FIG. 3 also has the cavity 46.

Figure 7:
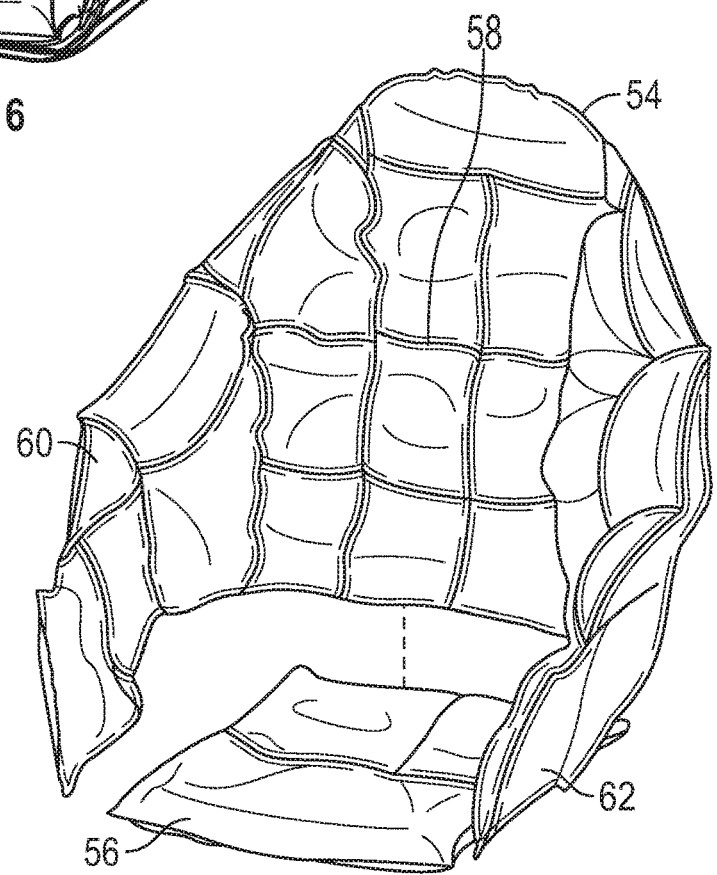
FIG. 7 is a schematic perspective, exploded view of the first airbag and the second airbag of the tulip armchair of FIG. 3, wherein the first and second airbags are in the inflated configuration.

In the depicted embodiment, the first airbag 54 has a tulip shape and includes an airbag seatback portion 58, a first airbag armrest portion 60, and a second airbag armrest portion 62. The airbag seatback portion 58 is connected between the first airbag armrest portion 60 and the second airbag armrest portion 62. The airbag seatback portion 58 is sandwiched by the seatback frame 38 and the seatback cushion 48. The first airbag armrest portion 60 is sandwiched by the first armrest frame 42 and the first armrest cushion 50. The second airbag armrest portion 62 is sandwiched by the second armrest frame 44 and the second armrest cushion 52. In the depicted embodiment, the first airbag 54 is a one-piece unitary structure to enhance its structural integrity. As a result, upon deployment, the entirety of the first airbag 54 inflates (FIG. 7).

The seat assembly 17 further include a second airbag 56 disposed between the base frame 40 and the second seat cushion 36. The second airbag 56 also has a stowed position (i.e., deflated configuration—FIG. 5) and a deployed position (i.e., inflated configuration—FIG. 7). The seat assembly may further include tethers to control the first airbag 54 and/or the second airbag 56 so that the cushion pressure and airbag size are adapted and optimized for different vehicle occupants O.

Figure 8:
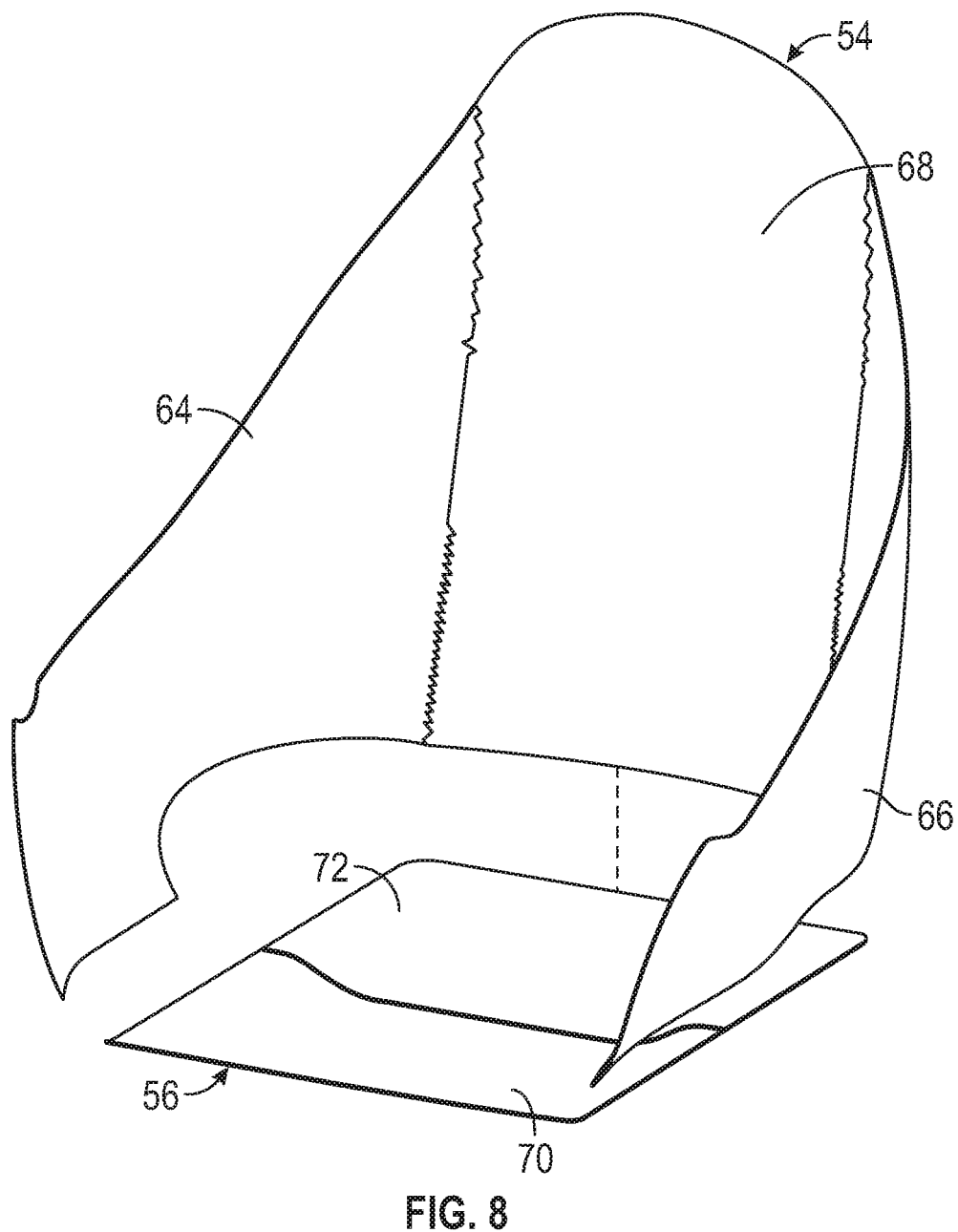
FIG. 8 is a schematic perspective, exploded view of the first airbag and the second airbag of the tulip armchair of FIG. 3, wherein the first and second airbags are in the deflated configuration and each have a plurality of chambers independently inflatable from each other.

FIG. 8 shows an embodiment substantially similar to the embodiment described above, except for the features described below. Each of the first airbag 54 and the second airbag 56 includes a plurality of chambers that are independently inflatable from each other. In particular, the first airbag 54 includes a first lateral chamber 64 disposed between the first armrest frame 42 and the first armrest cushion 50. The first lateral chamber 64 is inflatable independently of a rest of the first airbag 54. The first airbag 54 further includes a second lateral chamber 66 that is inflatable independently of the first lateral chamber 64. The second lateral chamber 66 is disposed between the second armrest frame 44 and the second armrest cushion 52. The first airbag 54 includes a seatback chamber 68 that is inflatable independently of the first lateral chamber 64 and the second lateral chamber 66. Further, the seatback chamber 68 is coupled between the first lateral chamber 64 and the second lateral chamber 66 by, for example, stitching. The seatback chamber 68 is disposed between the seatback frame 38 and the cushion seatback 35. The second airbag 56 includes a frontal chamber 70 and a rear chamber 72 independently inflatable from each other. The rear chamber 72 is closer to the seatback chamber 68 than the frontal chamber 70.

With reference to FIGS. 2, and 9, the controller 30 is programmed to control the operation of the first airbag 54 and the second airbag 56 based on the external force EF applied to the vehicle 10. Specifically, the controller 30 is programmed to determine that the external force has been applied to the vehicle based on a signal received from the first sensor 32. Further, the controller 30 is programmed to command the first airbag 54 and/or the second airbag 56 to deploy and inflate in response to determining that the external force EF has been applied to the vehicle 10. As discussed above, the first sensor 32 is configured to detect the external force EF exerted on the vehicle body 12 and to detect the direction of the external force EF applied to the vehicle 10. As discussed above, the second sensor 34 is configured to detect the position of the tulip armchair 18. As discussed above, the tulip armchair 18 is movable between the neutral position (FIG. 3) and the reclined position (FIG. 9).

The controller 30 is programmed to determine that the external force EF has been applied to the vehicle based on the signal received from the first sensor 32. Moreover, the controller 30 is programmed to determine whether the external force EF applied to the vehicle 10 is a rear external force REF based on the signal received from the first sensor 32. The rear external force REF is applied to the rear R of the vehicle 10. In response to determining that the external force EF has been applied to the vehicle 10 and that the external force EF applied to the vehicle 10 is the rear external force REF, the controller 30 is programmed to command solely the seatback chamber 68 to deploy and inflate in order to protect the back of the vehicle occupant O.

The controller 30 is programmed to determine whether the external force EF applied to the vehicle 10 is a frontal external force FEF based on the signal received from the first sensor 32. As discussed above, the frontal external force FEF is applied to the front F of the vehicle 10. The controller 30 is also programmed to determine that the tulip armchair 18 is in the neutral position (FIG. 3) based on a signal received from the second sensor 34. In response to determining that the external force EF has been applied to the vehicle 10, that the external force EF applied to the vehicle 10 is the frontal external force FEF, and that the tulip chair 18 is in the neutral position, the controller 30 is programmed to command solely the frontal chamber 70 to deploy and inflate in order to prevent the vehicle occupant O from slipping off the tulip chair 18.

The controller 30 is programmed to determine whether the external force EF applied to the vehicle 10 is a right-lateral external force RLF based on the signal received from the first sensor 32. The right-lateral external force RLF is applied to the right side RS of the vehicle 10. In response to determining that the external force EF has been applied to the vehicle 10 and that the external force EF applied to the vehicle 10 is the right-lateral external force RLF, the controller 30 is programmed to command solely the first lateral chamber 64 to deploy and inflate to protect the right side of the vehicle occupant O.

The controller 30 is programmed to determine whether the external force EF applied to the vehicle 10 is a left-lateral external force LLF based on the signal received from the first sensor 32. The left-lateral external force LLF is applied to the left side LS of the vehicle 10. In response to determining that the external force has been applied to the vehicle and that the external force EF applied to the vehicle 10 is the left-lateral external force LLF, the controller 30 is programmed to command solely the second lateral chamber 66 to deploy and inflate to protect the left side of the vehicle occupant O.

The controller 30 is programmed to determine whether the external force EF applied to the vehicle 10 is the frontal external force FEF based on the signal received from the first sensor 32. The controller 30 is programmed to determine whether the tulip armchair 18 is in the reclined position (FIG. 9) based on a signal received from the second sensor 34. In response to determining that the external force EF has been applied to the vehicle 10, that the external force EF applied to the vehicle 10 is the frontal external force FEF, and that the tulip armchair 18 is in the reclined position, the controller 30 is programmed to command the frontal chamber 70 and the rear chamber 72 to deploy and inflate to protect the legs of the vehicle occupant O.

While the best modes for carrying out the disclosure have been described in detail, those familiar with the art to which this disclosure relates will recognize various alternative designs and embodiments for practicing the disclosure within the scope of the appended claims.

What is claimed is:

1. A seat assembly of a vehicle, comprising:
   a seat frame, wherein the seat frame includes a seatback frame, a base frame coupled to the seatback frame, a first armrest frame coupled to the seatback frame, and a second armrest frame coupled to the seatback frame;
   a first seat cushion coupled to the seat frame, wherein the first seat cushion covers the seat frame, and the first seat cushion is spaced apart from the seat frame to define a cavity therebetween; and
   a first airbag coupled between the seat frame and the first seat cushion;
   wherein the first airbag has a stowed position and a deployed position;
   wherein, in the stowed position, the first airbag is disposed in the cavity between the seat frame and the first seat cushion;
   wherein, in the deployed position, the first airbag is partly disposed outside the cavity between the seat frame and the first seat cushion to absorb energy when an external force is applied to the vehicle;
   a second seat cushion covering the base frame;

a second airbag disposed between the base frame and the second seat cushion; and wherein the second airbag includes a frontal chamber and a rear chamber independently inflatable from each other.

2. The seat assembly of claim 1, wherein the first seat cushion covers the seatback frame, the first armrest frame, and the second armrest frame, the first seat cushion includes a seatback cushion covering the seatback frame, a first armrest cushion covering the first armrest frame, and a second armrest cushion covering the second armrest frame, the first airbag is disposed between the seatback frame and the seatback cushion, between the first armrest frame and the first armrest cushion, and between the second armrest frame and the second armrest cushion.

3. The seat assembly of claim 2, wherein the second airbag is disposed between the base frame and the second seat cushion.

4. The seat assembly of claim 1, wherein the first airbag includes a plurality of chambers independently inflatable from each other.

5. The seat assembly of claim 1, wherein the first seat cushion covers the seatback frame, the first armrest frame, and the second armrest frame, the first seat cushion includes a seatback cushion covering the seatback frame, a first armrest cushion covering the first armrest frame, and a second armrest cushion covering the second armrest frame the first airbag is disposed between the seatback frame and the seatback cushion, between the first armrest frame and the first armrest cushion, and between the second armrest frame and the second armrest cushion, the first airbag includes a first lateral chamber disposed between the first armrest frame and the first armrest cushion, and the first lateral chamber is inflatable independently of a rest of the first airbag.

6. The seat assembly of claim 5, wherein the first airbag includes a second lateral chamber that is inflatable independently of the first lateral chamber, and the second lateral chamber is disposed between the second armrest frame and the second armrest cushion.

7. The seat assembly of claim 6, wherein the first airbag includes a seatback chamber that is inflatable independently of the first lateral chamber and the second lateral chamber, and the seatback chamber is disposed between the seatback frame and the seatback cushion.

8. An airbag system for a vehicle, comprising:
a tulip armchair including:
a seat frame, wherein the seat frame includes a seatback frame, a base frame coupled to the seatback frame, a first armrest frame coupled to the seatback frame, and a second armrest frame coupled to the seatback frame;
a first seat cushion coupled to the seat frame, wherein the first seat cushion covers the seat frame, and the first seat cushion is spaced apart from the seat frame to define a cavity therebetween, the first seat cushion covers the seatback frame, the first armrest frame, and the second armrest frame, and the first seat cushion includes a first seatback cushion covering the seatback frame, a first armrest cushion covering the first armrest frame, and a second armrest cushion covering the second armrest frame; and
a first airbag coupled between the seat frame and the first seat cushion;
wherein the first airbag has a stowed position and a deployed position;

wherein, in the stowed position, the first airbag is disposed in the cavity between the seat frame and the first seat cushion;

wherein, in the deployed position, the first airbag is partly disposed outside the cavity between the seat frame and the first seat cushion to manage energy upon receipt of an external force;

wherein the first airbag is disposed between the seatback frame and the first seatback cushion, between the first armrest frame and the first armrest cushion, and between the second armrest frame and the second armrest cushion;

wherein the tulip armchair includes a second seat cushion covering the base frame;

wherein the airbag system includes a second airbag disposed between the base frame and the second seat cushion;

a sensor configured to detect the external force applied to the vehicle;

a controller in communication with the sensor and the first airbag;

wherein the controller is programmed to:
determine that the external force has been applied to the vehicle based on a signal received from the sensor; and
command the first airbag to deploy to the deployed position in response to determining that the external force has been applied to the vehicle.

9. The airbag system of claim 8, wherein the first seat cushion covers the seatback frame, the first armrest frame, and the second armrest frame, the first seatback cushion covers the seatback frame, the first armrest cushion covers the first armrest frame, and the second armrest cushion covers the second armrest frame, the first airbag is disposed between the seatback frame and the first seatback cushion, between the first armrest frame and the first armrest cushion, and between the second armrest frame and the second armrest cushion, the first airbag includes a first lateral chamber disposed between the first armrest frame and the first armrest cushion, and the first lateral chamber is inflatable independently of a rest of the first airbag, the first airbag includes a second lateral chamber that is inflatable independently of the first lateral chamber, the second lateral chamber is disposed between the second armrest frame and the second armrest cushion, the first airbag includes a seatback chamber that is inflatable independently of the first lateral chamber and the second lateral chamber, and the seatback chamber is disposed between the seatback frame and the first seatback cushion, the second airbag includes a frontal chamber and a rear chamber independently inflatable from each other, and the rear chamber is closer to the seatback chamber than the frontal chamber.

10. The airbag system of claim 9, wherein the sensor is a first sensor, the first sensor is further configured to detect a direction of the external force applied to the vehicle, the airbag system further includes a second sensor configured to detect a position of the tulip armchair, and the tulip armchair is movable between a neutral position and a reclined position.

11. The airbag system of claim 10, wherein the controller is programmed to:
determine that the external force has been applied to the vehicle based on the signal received from the first sensor;
determine that the external force applied to the vehicle is a rear external force based on the signal received from the first sensor, wherein the rear external force is applied to a rear of the vehicle; and
command solely the seatback chamber to inflate in response to determining that the external force has been applied to the vehicle and that the external force applied to the vehicle is the rear external force.

12. The airbag system of claim 10, wherein the signal is a first signal from the first sensor, and the controller is programmed to:
determine that the external force has been applied to the vehicle based on the first signal received from the first sensor;
determine that the external force applied to the vehicle is a frontal external force based on the first signal received from the first sensor, wherein the frontal external force is applied to a front of the vehicle;
determine that the tulip armchair is in the neutral position based on a second signal received from the second sensor; and
command solely the frontal chamber to inflate in response to determining that the external force has been applied to the vehicle and that the external force applied to the vehicle is the frontal external force, and that the tulip armchair is in the neutral position.

13. The airbag system of claim 10, wherein the signal is a first signal from the first sensor, and the controller is programmed to:
determine that the external force has been applied to the vehicle based on the first signal received from the first sensor;
determine that the external force applied to the vehicle is a frontal external force based on the first signal received from the first sensor, wherein the frontal external force is applied to a front of the vehicle;
determine that the tulip armchair is in the reclined position based on a second signal received from the second sensor; and
command the frontal chamber to inflate in response to determining that the external force has been applied to the vehicle, that the external force applied to the vehicle is the frontal external force, and that the tulip armchair is in the reclined position.

14. The airbag system of claim 10, wherein the controller is programmed to:
determine that the external force has been applied to the vehicle based on the signal received from the first sensor;
determine that the external force applied to the vehicle is a right-lateral external force based on the signal received from the first sensor, wherein the right-lateral external force is applied to a right side of the vehicle; and
command solely the first lateral chamber to inflate in response to determining that the external force has been applied to the vehicle and that the external force applied to the vehicle is the right-lateral external force.

15. The airbag system of claim 10, wherein the controller is programmed to:
determine that the external force has been applied to the vehicle based on the signal received from the first sensor;
determine that the external force applied to the vehicle is a left-lateral external force based on the signal received from the first sensor, wherein the left-lateral external force is applied to a left side of the vehicle; and
command solely the second lateral chamber to inflate in response to determining that the external force has been applied to the vehicle and that the external force applied to the vehicle is the left-lateral external force.

16. The airbag system of claim 10, wherein the signal received from the first sensor is a first signal, and the controller is programmed to:
determine that the external force has been applied to the vehicle based on the signal received from the first sensor;
determine that the external force applied to the vehicle is a frontal external force based on the first signal received from the first sensor, wherein the frontal external force is applied to a front of the vehicle;
determine that the tulip armchair is in the reclined position based on a second signal received from the second sensor; and
command the frontal chamber and the rear chamber to inflate in response to determining that the external force has been applied to the vehicle, that the external force applied to the vehicle is the frontal external force, and that the tulip armchair is in the reclined position.

* * * * *